UNITED STATES PATENT OFFICE.

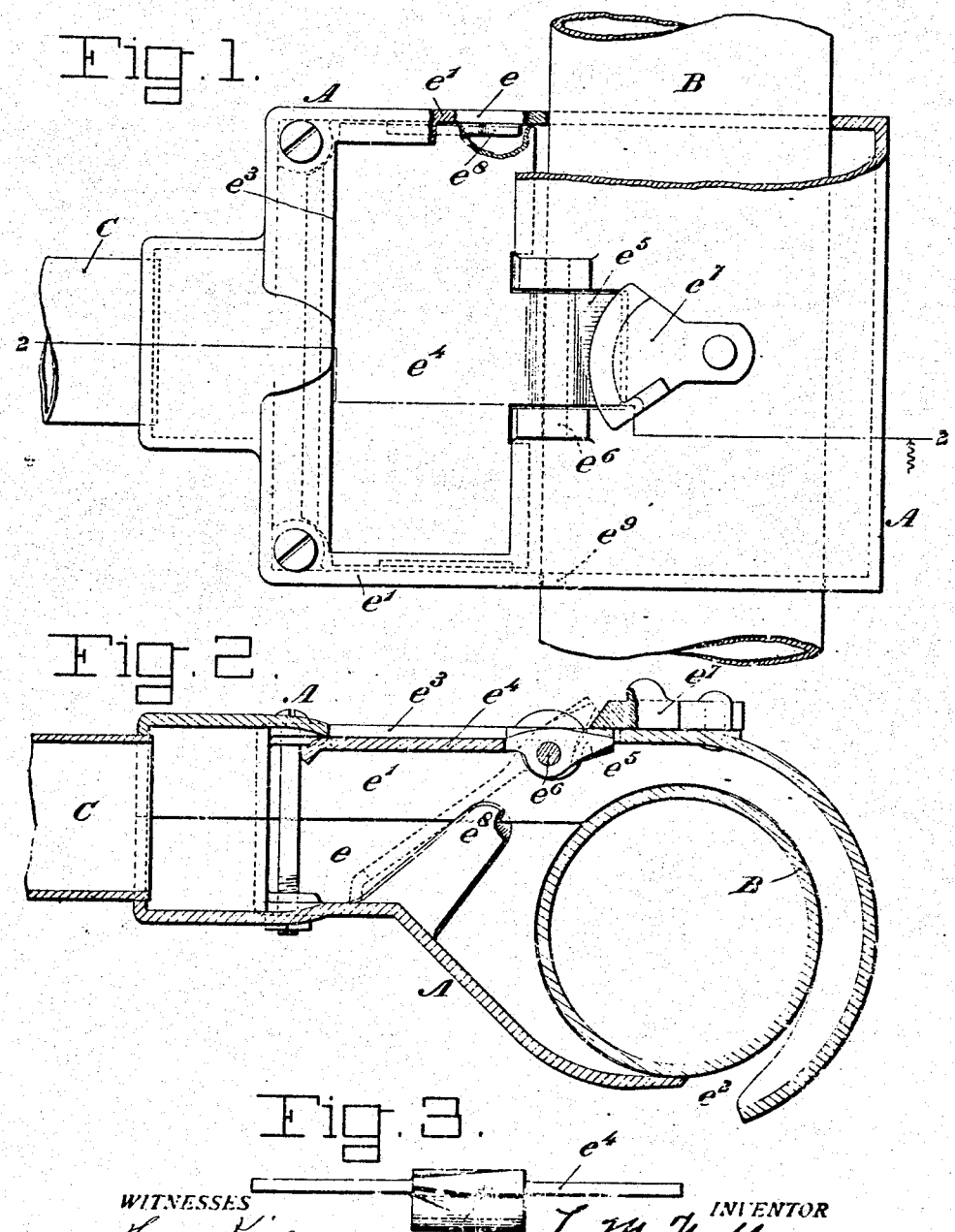

LAWSON MAYO FULLER, OF MOLINE, ILLINOIS, ASSIGNOR TO VELIE MOTOR VEHICLE COMPANY, OF MOLINE, ILLINOIS, A CORPORATION OF ILLINOIS.

AIR-INTAKE FOR CARBURETERS.

971,034.  Specification of Letters Patent.  Patented Sept. 27, 1910.

Application filed July 31, 1909. Serial No. 510,633.

*To all whom it may concern:*

Be it known that I, LAWSON MAYO FULLER, a citizen of the United States, residing at Moline, in the county of Rock Island and State of Illinois, have invented certain new and useful Improvements in Air-Intakes for Carbureters; and I do hereby declare the following to be a full, clear, and exact description of the invention, such as will enable others skilled in the art to which it appertains to make and use the same.

My invention relates to gas engines for motor-cars and other purposes, and more particularly to means for supplying a vaporizing device, such as a carbureter, with air having a proper temperature for making an effective mixture.

The principal object of the invention is to provide an air-intake or cage that can be used to supply the carbureter with air heated artificially when required as in the winter time; and which, when the air is warmed sufficiently by prevailing atmospheric conditions, can be used to take in and supply the carbureter with air thus warmed naturally.

The invention will first be described with reference to the accompanying drawings and then more particularly pointed out in the appended claims.

Referring to the drawings: Figure 1 is a plan view, partly broken away, of an embodiment of the invention. Fig. 2 is a vertical section on the line 2—2 of Fig. 1, showing the valve or door closed in full lines and open in dotted lines. Fig. 3 is an edge view of the valve or door viewed from its pivot-side.

A denotes a hot air box or cage which encircles the exhaust pipe B of an automobile or other motor and has an outlet pipe C to the carbureter, for the purpose of supplying to the carbureter, in cold weather, air sufficiently warmed to make an effective mixture. Neither the engine nor the carbureter is shown. The box A is adapted to admit air either in contact with the exhaust pipe so as to be heated thereby, or independently of or out of contact with the exhaust pipe so as to supply air at the prevailing atmospheric temperature. The box illustrated is composed of separable sections $e$, $e^1$ adapted to be secured together, after being mounted on the exhaust pipe, by bolts as shown. The sections $e$, $e^1$ are of the form of half boxes, each being composed of a plate having side flanges extending therefrom at an angle to the plate, the side flanges of one section being adapted when the sections are assembled, to abut those of the other section for a portion of their length, thus forming a hollow member for the passage of air. Each section $e$, $e^1$ is formed at its inner end with a semi-cylindrical extension, the two extensions forming a boss for the reception of the pipe C. At their opposite or outer end each section or half box is concaved or curved oppositely to engage the opposite cylindrical surface of the exhaust pipe, the side flanges of the sections contacting with the exhaust pipe, thereby forming an air space at the sides of the pipe. In the form shown, the admission of air around the exhaust pipe is secured by forming the section $e$, $e^1$ to provide an intake mouth $e^2$ at the termination of their curved ends. This may be accomplished by ending the side flanges of the section $e$ short of the edge of its outer or curved end, and forming such end to hug the exhaust pipe, and by forming the terminating portion of the section $e^1$ to stand out or away from the exhaust pipe.

To provide for the admission of air unaffected by artificial heat, an inlet opening $e^3$ controlled by a valve or door $e^4$ is formed in one of the sections, the section $e^1$ in the illustrated embodiment, forward of the exhaust pipe. The valve $e^4$ is provided with a pivot-extension $e^5$ which may be provided with an aperture to receive a pin $e^6$ which forms the pivot for the door and which is mounted in lugs depending from the inner surface of the section $e^1$. The extension $e^5$ is prolonged beyond the pivot $e^6$, and at its free end, its upper and lower surfaces are inclined oppositely as shown in detail in Figs. 2 and 3. The extension $e^5$ is disposed in an opening branching off from one side of the inlet opening $e^3$; and pivoted to the section $e^1$ adjacent the pivot-extension is a button $e^7$ having a beveled upper edge, and if desired, an upstanding lug as shown to provide a finger grip for turning the button. The latter is adapted to lock the door $e^4$ in either its opened or closed position.

To lock the door in its closed position, the button is turned to engage and overlie the upper inclined surface of the pivot-extension, as shown in full lines in Fig. 2; and to lock the valve in its opened position, the button is turned to bring its beveled edge in engagement with the under inclined surface of such extension, as shown in dotted lines in Fig. 2. In either of these positions the button $e^7$ is self-locking by reason of its frictional engagement with either the upper or lower inclined surfaces, these inclined surfaces serving as wedges that hold the button against accidental displacement and prevent the door from rattling. The door $e^5$ may if desired be terminated by an angularly disposed lip as shown, which, in the open position of the door, abuts the transverse plate of the section $e$.

As a convenient means for readily assembling and positioning the sections $e$, $e^1$ in their proper relative position, one of the sections may be provided with lugs $e^8$ which project beyond the side flanges of such section and overlie the side flanges of the opposite section. In assembling the parts the pivot pin $e^6$ may be inserted through an aperture $e^9$ in one of the side flanges of the section $e^1$.

The operation, briefly stated, is as follows: With the box or cage A mounted on the exhaust manifold and in communication with the carbureter by means of the pipe C, air heated artificially can be supplied to the carbureter by maintaining the valve or door in its closed position, as shown in full lines in Fig. 2. In this position air enters through the mouth $e^2$, passes around and is heated by the exhaust pipe and then flows on to the carbureter through the pipe C. If the atmospheric conditions warm the air sufficiently to render additional heating of the air unnecessary or undesirable, the door is opened as shown in dotted lines in Fig. 2; and in this position air enters from the atmosphere without contacting with the exhaust pipe and flows to the pipe C and thence to the carbureter, the door in its open position being interposed between the exhaust pipe and the inflowing column of air and forming a partition between the two.

Another valuable feature of this intake is the prevention of accidental fires. It very frequently happens that the motor of an automobile will fire back into the carbureter and if the opening for the air intake is exposed, the ignited gasolene can communicate to surrounding parts of the car and set them on fire, causing a partial or total destruction of the automobile. With the present invention, due to the fact that the air intake opening is fitted with a tube extending clear up to the air cage which surrounds the exhaust pipe, the gasolene if ignited could in no case cause serious damage and the chance for ignition is greatly lessened in any event because the length of the intake pipe is such as to almost certainly preclude the flame from extending so high, and, even if it did, it would be surrounded by metallic walls and metallic surfaces in every direction. To use an ordinary hot air intake for the purpose of assurance against fires of this kind is not advisable, because in summer weather, or during the heated season, it may not be desirable to heat the air above normal temperature. By the use of my invention all the protection against fires is obtained and the air may be taken at normal temperature or artificially heated as desired.

I am aware that modifications can be made in some of the details of my invention without departing from its spirit and scope, and I therefore reserve the right to such modifications.

Having described my invention what I claim is:

1. A device of the character described comprising a box approximately rectangular in cross-section at its inner end, said end being adapted for connection to an air-supply pipe, the box being formed at its outer end to embrace a heated pipe and to provide air space between the pipe and the walls of said box, an opening being formed in said outer end to admit air in contact with the heated pipe, one wall of the rectangular portion of the box being formed with an opening, and a door hinged to the box and controlling the latter opening, the door when open admitting air from the atmosphere and forming a partition between said inflowing column of air and the heated pipe.

2. A device of the character described comprising a box formed at its inner end for connection to an air-supply pipe and having its outer end formed to embrace a heated pipe, said outer end being provided with an opening to admit air in contact with said heated pipe, the inner end of the box being also formed with an opening for the admission of air, a movable door controlling said opening and adapted when open to form a partition across the box between the heated pipe and the column of air flowing to the air-supply pipe, and means for locking the door in its opened or closed position.

3. A device of the character described comprising a box or cage formed of separable sections, the sections being formed at one end to connect to an air-supply pipe and being formed at their opposite ends to embrace the exhaust pipe of a motor, the separable sections at their ends embracing the exhaust pipe being separated to admit air in contact with said exhaust pipe.

4. A device of the character described comprising a box or cage formed of separable sections each section composed of a plate having side-flanges extending therefrom, the side flanges of one section abutting those of the other for a portion of their length, each section having at one end a semi-cylindrical boss, said bosses forming jointly a connection for an air-supply pipe to a carbureter, and the opposite ends of the sections being oppositely curved or concaved to embrace opposite sides of the exhaust pipe of a motor, the side flanges spacing their respective plates away from the exhaust pipe to provide an air-space at its sides, the extremities of the concaved ends being separated to permit the entrance of air into the box and means for securing the separable sections together.

5. A device of the character described comprising a box or cage formed to be connected to the air-supply pipe of a carbureter and formed also to be mounted on the exhaust pipe of a motor, the box being formed to admit air in contact with said heated pipe and the box being also formed with an opening to admit air out of contact with the heated pipe, and a door controlling the latter opening and adapted to open inwardly, the door when open resting on the opposite wall of the box or cage and cutting off the exhaust-pipe portion from the pipe leading to the carbureter.

6. A device of the character described comprising a box or cage having an air inlet opening, a door controlling said opening and pivoted to the box, the door having an extension beyond its pivotal point, said extension having its upper and lower faces inclined, and a button pivoted to the box and adapted to be turned to engage either the upper or lower inclined face to hold the door either closed or open.

7. A device of the character described comprising a box or cage formed of separable sections each having a plate with side flanges depending therefrom, the sections being formed at their inner ends to connect to an air-supply pipe and the sections being oppositely curved or concaved at their outer ends to embrace the opposite surfaces of a heated pipe, the side flanges of one section terminating short of the end of its curved section whereby said end is adapted to hug the heat pipe, and the end of the opposite curved section being spaced away from said pipe to provide an air inlet, the latter section of the box being provided with an opening for admitting air out of contact with said heated pipe, a valve or door controlling said opening, and means for securing the separable sections together.

In testimony whereof I affix my signature, in presence of two witnesses.

LAWSON MAYO FULLER.

Witnesses:
CHAS. S. DAHLQUIST,
CHAS. B. ROSE.